United States Patent
Kraewer et al.

(10) Patent No.: US 11,940,350 B2
(45) Date of Patent: Mar. 26, 2024

(54) METHOD AND DEVICE FOR DIAGNOSING AT LEAST ONE EXHAUST GAS SENSOR OF AN INTERNAL COMBUSTION ENGINE DISPOSED IN AN EXHAUST DUCT

(71) Applicant: Robert Bosch GmbH, Stuttgart (DE)

(72) Inventors: Bernd Kraewer, Winnenden (DE); Magnus Labbe, Moeglingen (DE); Maik Unverricht, Rutesheim (DE); Simon Fass, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/972,917

(22) Filed: Oct. 25, 2022

(65) Prior Publication Data

US 2023/0129835 A1 Apr. 27, 2023

(30) Foreign Application Priority Data

Oct. 26, 2021 (DE) ...................... 10 2021 212 025.3

(51) Int. Cl.
*G01M 15/02* (2006.01)
*F02D 41/14* (2006.01)
*F02D 41/22* (2006.01)

(52) U.S. Cl.
CPC ......... *G01M 15/02* (2013.01); *F02D 41/1461* (2013.01); *F02D 41/1463* (2013.01); *F02D 41/222* (2013.01)

(58) Field of Classification Search
CPC .......................... G01M 15/02; F02D 41/1461; F02D 41/1463; F02D 41/222; F02D 41/1441; F02D 41/1454; Y02T 10/40
See application file for complete search history.

(56) References Cited

U.S. PATENT DOCUMENTS

| | | | | |
|---|---|---|---|---|
| 6,973,777 B2* | 12/2005 | Bayerle | ..................... | F01N 3/22 60/276 |
| 8,024,108 B2* | 9/2011 | Hacker | ................... | F01N 3/225 73/114.71 |
| 10,443,475 B2* | 10/2019 | Lipa | ........................ | F01N 3/225 |
| 11,591,947 B1* | 2/2023 | Schumaker | ............. | F01N 9/005 |
| 2004/0011027 A1* | 1/2004 | Hirooka | ..................... | F01N 3/22 60/307 |
| 2005/0120711 A1* | 6/2005 | Koyama | ................... | F01N 3/22 60/289 |
| 2007/0084425 A1* | 4/2007 | Hirose | ................ | F02D 13/0261 123/90.1 |
| 2007/0137185 A1* | 6/2007 | Muraguchi | ............... | F01N 3/32 60/289 |

(Continued)

FOREIGN PATENT DOCUMENTS

DE 102011006831 A1 10/2012

*Primary Examiner* — Joseph J Dallo
(74) *Attorney, Agent, or Firm* — Michael Best & Friedrich LLP

(57) ABSTRACT

Method for diagnosing at least one exhaust gas sensor (22;24;26) of an internal combustion engine (10) disposed in an exhaust duct (21), where ambient air (12) is actively introduced into the exhaust duct (21) by means of a device (27), when an operating state is present in which the internal combustion engine (10) does not produce an exhaust gas mass flow, and the diagnosis of the at least one exhaust gas sensor (22;24;26) disposed in the exhaust duct (21) is subsequently carried out.

14 Claims, 3 Drawing Sheets

(56) References Cited

U.S. PATENT DOCUMENTS

2009/0265074 A1* 10/2009 Heinrich ............... G01M 3/025
  73/40.7
2014/0102206 A1* 4/2014 Oshima .................. G01L 9/008
  73/715

* cited by examiner

METHOD AND DEVICE FOR DIAGNOSING AT LEAST ONE EXHAUST GAS SENSOR OF AN INTERNAL COMBUSTION ENGINE DISPOSED IN AN EXHAUST DUCT

BACKGROUND OF THE INVENTION

The use of components such as catalytic converters or sensors for exhaust aftertreatment of internal combustion engines is subject to requirements regarding the monitoring the components imposed by the statutory legislation of the respective target markets. The objective of these requirements is to ensure the functionality of the components.

Such requirements also apply to NOx sensors and lambda sensors.

NOx sensors are most often used in exhaust systems for diesel systems. In the course of tightening exhaust emission limits for internal combustion engines, future use in other internal combustion engines, such as gasoline engines, is conceivable as well.

DE 10 2011 006 831 A1 discloses a method for diagnosing a NOx sensor (29) which is disposed in the exhaust tract (14) of an internal combustion engine of a motor vehicle controlled by an engine control device (11) and generates a measurement signal characterizing the nitrogen oxide concentration in the exhaust gas. To carry out a simple quick workshop test on the motor vehicle for functional testing of the NOx sensor (29), a defined intervention in the operating state of the running internal combustion engine is used to cause a sudden change in the nitrogen oxide concentration in the exhaust gas and the current value of the measurement signal of the NOx sensor (29) is checked for changes.

SUMMARY OF THE INVENTION

In a first aspect, the invention relates to a method for diagnosing at least one exhaust gas sensor of an internal combustion engine disposed in an exhaust duct, wherein ambient air can be actively introduced into the exhaust duct by means of a device, wherein, when an operating state is present, in which the internal combustion engine does not produce an exhaust gas mass flow, ambient air, in particular oxygen, is actively introduced into the exhaust duct by the device, wherein the diagnosis of the at least one exhaust gas sensor disposed in the exhaust duct is subsequently carried out.

The method offers the particular advantage that, if an operating state is present, in which the internal combustion engine does not produce an exhaust gas mass flow, the active introduction of ambient air into an exhaust duct of the internal combustion engine, in particular oxygen, produces an oxygen concentration in the exhaust duct or on the exhaust gas sensors that is needed for diagnosis or self-diagnosis of the exhaust gas sensors. Actively introducing ambient air makes it possible to flood the exhaust duct or the area around the exhaust gas sensor to be diagnosed with ambient air, so that no or virtually no exhaust gas or exhaust gas components are present there anymore. A diagnosis of the at least one exhaust gas sensor can then be carried out in a robust manner.

The method provides the ability to carry out a robust diagnosis for the exhaust gas sensors, so that emissions legislation or emission standards can be complied with better and more effectively.

The device for introducing ambient air into the exhaust duct can furthermore be disposed in the exhaust duct upstream of the at least one exhaust gas sensor.

The device can moreover introduce ambient air directly into the exhaust duct via an ambient air inlet which is connected to the exhaust duct and the device.

In an alternative embodiment, the device can actively introduce ambient air into the exhaust duct, wherein the ambient air is introduced into the exhaust duct downstream in the flow direction of the exhaust gas.

The device can also draw in ambient air, wherein the ambient air is introduced into the exhaust duct upstream against the flow direction of the exhaust gas.

This has the particular advantage that, depending on the installation location of the exhaust gas sensor and the device, air can also be actively drawn into the exhaust duct from the side of the outlet of the exhaust pipe. In other words, the ambient air is introduced into the exhaust duct upstream of the normal flow direction of the exhaust gas.

In an alternative embodiment, the ambient air introduced into the exhaust duct is introduced close to the location of the at least one exhaust gas sensor.

This has the advantage that the area around the exhaust gas sensor can be flooded particularly quickly.

The at least one exhaust gas sensor can also be configured as a NOx sensor. The method can be robustly applied to a NOx sensor, because said sensor requires a gas environment for self-diagnosis, which corresponds to a gas composition of the ambient air.

A NOx concentration can moreover be determined by the at least one NOx sensor and the diagnosis for the at least one NOx sensor can be carried out on the basis of a comparison of the NOx concentration with a reference NOx concentration.

The at least one exhaust gas sensor can also be configured as a lambda sensor.

The method can be robustly applied to a lambda sensor, because said sensor requires a gas environment for self-diagnosis, which corresponds to a gas composition of the ambient air.

A current oxygen concentration can moreover be determined by the at least one lambda sensor and the diagnosis for the at least one lambda sensor can be carried out on the basis of a comparison of the current oxygen concentration with a reference oxygen concentration.

In a further embodiment, the device can be configured as a fan or secondary air pump or exhaust gas burner or as an opening comprising an actuating element in the exhaust duct.

A predefinable period of time after the active introduction of ambient air by the device is furthermore waited before the diagnosis of the at least one exhaust gas sensor is carried out.

Waiting for the period of time has the advantage that there is enough ambient air for a robust diagnosis of the at least one exhaust gas sensor at the exhaust gas sensor to be diagnosed and that no or no excessive concentration of exhaust gas components, such as NOx, NH3, H2, is present in the exhaust duct and/or at the location of the exhaust gas sensors.

In further aspects, the invention relates to a device, in particular a control device and a computer program configured, in particular programmed, to carry out any one of the methods. In yet another aspect, the invention relates to a machine-readable storage medium on which the computer program is stored.

BRIEF DESCRIPTION OF THE DRAWINGS

The invention will be explained in more detail in the following with reference to a design example shown in the figures. The figures show.

DETAILED DESCRIPTION

Figure 1:
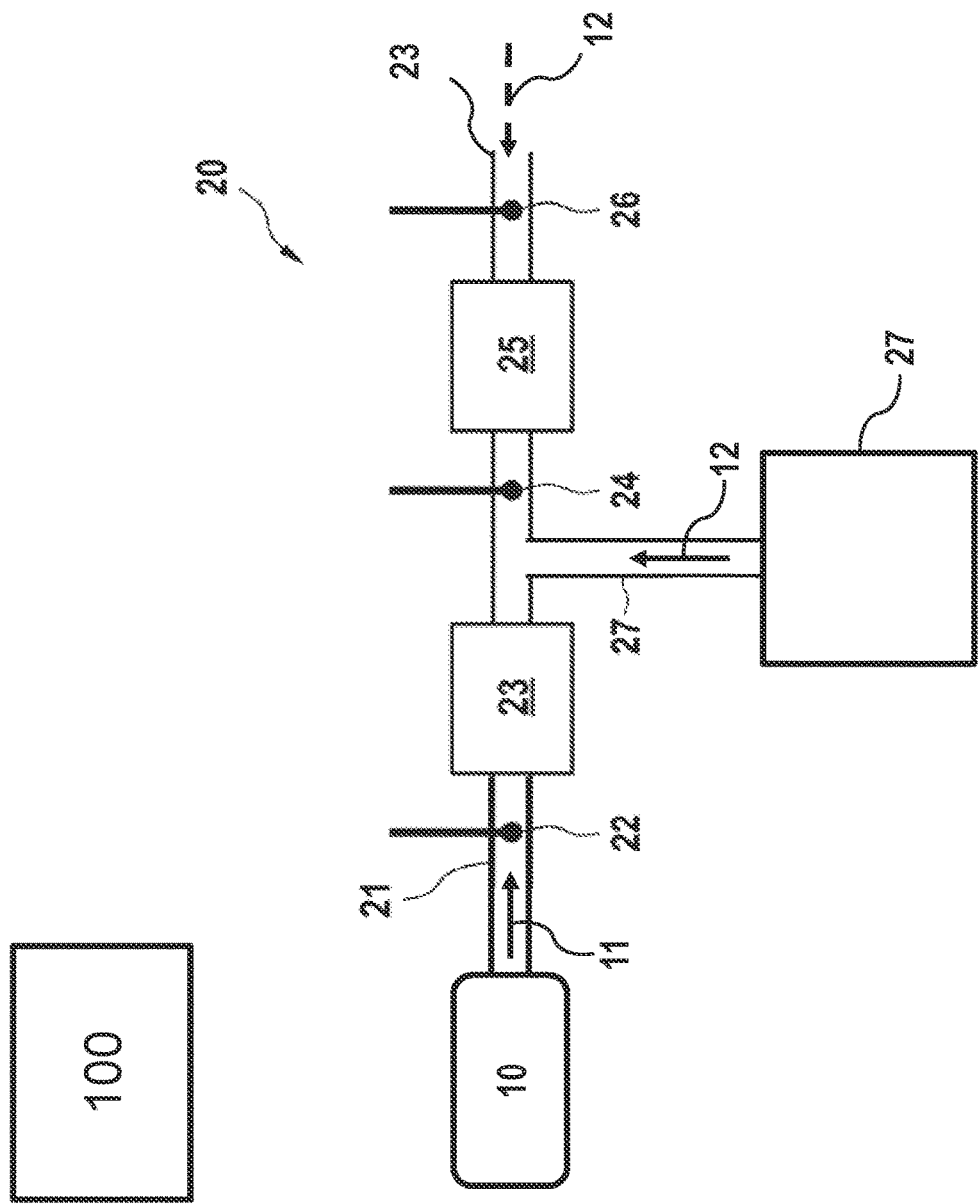
FIG. 1 in a schematic illustration, an exhaust aftertreatment system of an internal combustion engine comprising at least one exhaust gas sensor to be diagnosed, and FIG. 2 a schematic flowchart of a first embodiment example of the diagnosis according to the invention of at least one exhaust gas sensor of an internal combustion engine disposed in an exhaust duct, and FIG. 3 a schematic flowchart of a second embodiment example of the diagnosis according to the invention of at least one exhaust gas sensor of an internal combustion engine disposed in an exhaust duct.

FIG. 1 shows a schematic illustration of an exhaust aftertreatment system 20 of an internal combustion engine 10 comprising an ambient air inlet 27 disposed downstream of a second lambda probe 24. The shown internal combustion engine 10 can be configured as a gasoline engine, diesel engine, gas engine or hydrogen burner.

The regulation or control of the internal combustion engine 10 is carried out by a control device 100. Known functions for regulating a mixture formation, an injection, a torque coordinator, an operating state coordinator are stored on the control device 100.

The connection to sensors can be wired, e.g., via a control device area network (CAN). The control device 112 furthermore takes on driving functions such as start-stop scenarios and/or coasting operations, whereby the control device 112 uses operating variables such as driver request information, rotational speed and/or load requirement to decide whether a joint operation of the internal combustion engine 101 and the electric machine 102 or a purely electric drive will be carried out for the driver request.

The exhaust gas 11 of internal combustion engine 10 is guided along an exhaust duct 21 through the exhaust aftertreatment system 20.

The flow direction of exhaust gas 11 is defined such that exhaust gas 11 from combustion flows downstream of the internal combustion engine 10 in the direction of the outlet of the exhaust pipe 23 and exits said exhaust pipe. The exhaust gas 11 passes the exhaust gas sensors, catalytic converters and other components disposed in the exhaust duct 21.

A first catalytic converter 23 and then a second catalytic converter 25 are disposed in the exhaust duct 21 along the exhaust duct 21 downstream of the internal combustion engine 10.

A first exhaust gas sensor 22 is disposed in the exhaust duct 21 downstream of the internal combustion engine 10 and upstream of the first catalytic converter 23.

A second exhaust gas sensor 24 is disposed downstream of the first catalytic converter 23 and upstream of the second catalytic converter 25.

A third exhaust gas sensor 26 is furthermore disposed in the exhaust duct 21 downstream of the second catalytic converter 25 and upstream of the outlet of the exhaust pipe 23.

In the design example, an ambient air inlet 27 is moreover connected to the exhaust duct 21 downstream of the first catalytic converter 23 and upstream of the second exhaust gas sensor 24.

Secondary air 12, in particular oxygen contained in the ambient air, can be supplied to the exhaust duct 21 via the ambient air inlet 27.

A device 27 can be connected to the ambient air inlet 27 for this purpose.

The device 27 can be configured as a fan, a secondary air pump, a fan of an exhaust gas burner or as a device with which ambient air 12 can be introduced into the exhaust duct 21 in a controlled or active manner.

The device 27 can preferably actively introduce ambient air to the exhaust duct 21, so that the exhaust duct 21 is flooded with ambient air along the flow direction of the exhaust gas 11.

In an alternative embodiment, the device 27 can also be configured as an actuating element, whereby the actuating element can be opened and closed and thus introduce ambient air into the exhaust duct 21.

In a particular embodiment, the device 27 can also produce an opposite flow against the normal flow direction of the exhaust gas 11 in the exhaust duct 21. This could be accomplished by a fan or a secondary air pump, for example, whereby the fan is configured such that the fan can actively blow ambient air into the exhaust duct 21 or draw ambient air out of the exhaust duct 21. Ambient air 12 would thus be drawn in upstream of the outlet of the exhaust pipe 23 and drawn all the way to the device 27.

The signals from the first, second, and third exhaust gas sensors 22, 24, 27 are received and stored continuously or in a time-discrete manner by the control device 100.

Figure 2:
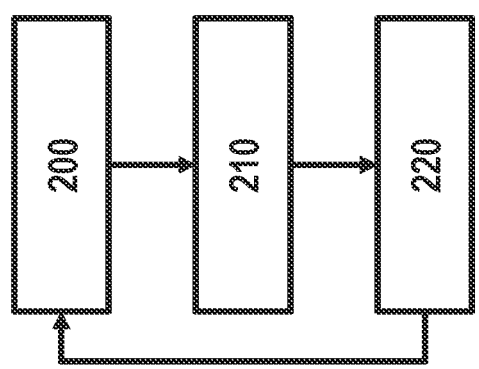

FIG. 2 shows a first example of a sequence of the method for diagnosing at least one exhaust gas sensor 21;24;26 of an internal combustion engine 10 disposed in an exhaust duct 21, wherein a release condition for the method is checked in a first Step 200.

A release for the method for diagnosing is given when an operating state coordinator for the internal combustion engine 10 identifies a shutdown request for the internal combustion engine 10 in which the internal combustion engine 10 does not provide an exhaust gas mass flow.

These operating states are preferably determined using known operating variables of the internal combustion engine 10, such as driver request information, air mass flow, exhaust gas mass flow, exhaust temperature, rotational speed and/or load requirement.

The control device 100 is configured to identify the operating state of the internal combustion engine 10 by means of an operating state coordinator that is running on the control device 100.

In an alternative embodiment, a shutdown process for the internal combustion engine can also be requested via the diagnosis.

If the release for a requested shutdown process of the internal combustion engine 10 is present, the method continues in Step 210.

With the granted release from Step 200, the device 27 is controlled by the control device 100 in a Step 210 in such a way that ambient air is actively introduced into exhaust duct 21. The device 27 can preferably be a fan, a secondary air pump, a fan of an exhaust gas burner. Depending on the exhaust gas sensor to be diagnosed, information whether the device 27 should blow or draw ambient air into the exhaust duct 21 can be stored in the control device 100, for example in an application, so that the exhaust duct 21 or the area around the exhaust gas sensor to be diagnosed can be flooded as quickly as possible with ambient air.

In an advantageous embodiment, the activation of the device 27 by the control device 100 includes waiting a predefinable period of time $\Delta t$, wherein the predefinable period of time $\Delta t$ is preferably determined in an application phase for the method and stored in the control device 100. This predefinable period of time $\Delta t$ can be determined for each installation position of the exhaust gas sensors in the exhaust duct 21, for example by means of a model, wherein the model determines the time from which there is enough ambient air at the exhaust gas sensors to be diagnosed so that no or virtually no exhaust gas or exhaust gas components is present there. The reason for waiting the period of time $\Delta t$ is ensuring that there is enough ambient air for a robust diagnosis of the at least one exhaust gas sensor at the exhaust gas sensor to be diagnosed and that no or no excessive concentration of exhaust gas components, such as NOx, NH3, H2, can be determined anymore.

In the further design example, the diagnosis will be limited to a diagnosis for the second exhaust gas sensor 24. However, the method can be used without limitation for the exhaust gas sensors 22,24,26 in the exhaust duct 21, which are installed downstream or upstream of ambient air inlet 27.

The method then continues in Step 220.

The diagnosis for the second exhaust gas sensor 24 is started in a Step 220. In the following example, the second exhaust gas sensor 24 is configured as a NOx sensor 24 which sends a current NOx concentration $NOx_{act}$ to the control device 100 continuously or in a time-discrete manner. Exhaust gas probe and exhaust gas sensor are to be understood as synonymous.

With the start of the diagnosis of the NOx sensor 24, the NOx concentration $NOx_{act}$ is received by the control device 100 over a predefinable time and is preferably averaged.

The current NOx concentration $NOx_{act}$ is then compared to a reference NOx concentration $NOx_{ref}$ stored in the control device 100. The reference NOx concentration $NOx_{ref}$ represents a NOx concentration for ambient air.

The comparison is preferably determined as a first difference $D_1$ between the reference NOx concentration $NOx_{ref}$ and the current NOx concentration $NOx_{act}$.

If the first difference $D_1$ exceeds a predefinable NOx threshold value $S_{NOx}$, the NOx sensor 24 is identified as faulty.

In a particular embodiment, the diagnosis of the NOx sensor 24 can be carried out over a number of driving cycles and/or over a number of releases for diagnosing the NOx sensor 24. For this purpose, the evaluations from the individual driving cycles and/or releases are stored in the control device 100 as intermediate values and/or intermediate results and can subsequently be evaluated.

The method can then be started from the beginning in Step 200 or terminated.

Figure 3:
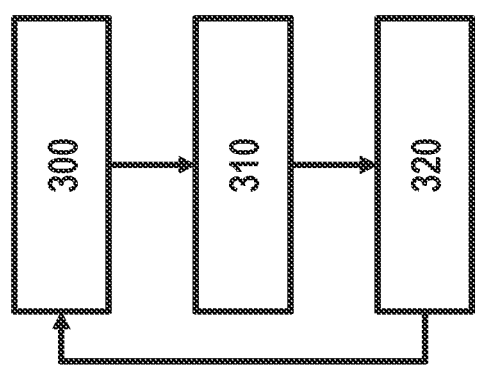

FIG. 3 shows a second example of a sequence of the method for diagnosing at least one exhaust gas sensor 21;24;26 of an internal combustion engine 10 disposed in an exhaust duct 21, wherein a release condition for the method is checked in a first Step 300.

A release for the method for diagnosing is given when an operating state coordinator for the internal combustion engine 10 identifies a shutdown request for the internal combustion engine 10 in which the internal combustion engine 10 does not provide an exhaust gas mass flow.

These operating states are preferably determined using known operating variables of the internal combustion engine 10, such as driver request information, air mass flow, exhaust gas mass flow, exhaust temperature, rotational speed and/or load requirement.

The control device 100 is configured to identify the operating state of the internal combustion engine 10 by means of an operating state coordinator that is running on the control device 100.

In an alternative embodiment, a shutdown process for the internal combustion engine can also be requested via the diagnosis.

If the release for a requested shutdown process of the internal combustion engine 10 is present, the method continues in Step 310.

With the granted release from Step 300, the device 27 is controlled by the control device 100 in a Step 310 in such a way that ambient air is actively introduced into exhaust duct 21. The device 27 can preferably be a fan, a secondary air pump, a fan of an exhaust gas burner. Depending on the exhaust gas sensor to be diagnosed, information whether the device 27 should blow or draw ambient air into the exhaust duct 21 can be stored in the control device 100, for example in an application, so that the exhaust duct 21 or the area around the exhaust gas sensor to be diagnosed can be flooded as quickly as possible with ambient air.

In an advantageous embodiment, the activation of the device 27 by the control device 100 includes waiting a predefinable period of time $\Delta t$, wherein the predefinable period of time $\Delta t$ is preferably determined in an application phase for the method and stored in the control device 100. This predefinable period of time $\Delta t$ can be determined for each installation position of the exhaust gas sensors in the exhaust duct 21, for example by means of a model, wherein the model determines the time from which there is enough ambient air at the exhaust gas sensors to be diagnosed so that no or virtually no exhaust gas or exhaust gas components is present there. The reason for waiting the period of time $\Delta t$ is ensuring that there is enough ambient air for a robust diagnosis of the at least one exhaust gas sensor at the exhaust gas sensor to be diagnosed and that no or no excessive concentration of exhaust gas components, such as NOx, NH3, H2, can be determined anymore.

In the further design example, the diagnosis will be limited to a diagnosis for the second exhaust gas sensor 24. However, the method can be used without limitation for the exhaust gas sensors 22,24,26 in the exhaust duct 21, which are installed downstream or upstream of ambient air inlet 27.

The method then continues in Step 320.

The diagnosis for the second exhaust gas sensor 24 is started in a Step 320. In the following example, the second exhaust gas sensor 24 is configured as a lambda sensor 24 which sends a current oxygen concentration $O2_{act}$ to the control device 100 continuously or in a time-discrete manner.

With the start of the diagnosis of the lambda sensor 24, the current oxygen concentration $O2_{act}$ is received by the control device 100 over a predefinable time and is preferably averaged.

The current oxygen concentration $O2_{act}$ is then compared to a reference oxygen concentration $O2_{ref}$ stored in the control device 100. The reference oxygen concentration $O2_{ref}$ represents an oxygen concentration for the ambient air, whereby the oxygen content of the ambient air is approximately 20.8%.

The comparison is preferably determined as a second difference $D_2$ between the reference oxygen concentration $O2_{ref}$ and the current oxygen concentration $O2_{act}$.

If the second difference $D_2$ exceeds a predefinable oxygen threshold value $S_{O2}$, the oxygen sensor 24 is identified as faulty.

In a particular embodiment, the diagnosis of the oxygen sensor 24 can be carried out over a number of driving cycles and/or over a number of releases for diagnosing the oxygen sensor 24. For this purpose, the evaluations from the individual driving cycles and/or releases are stored in the control device 100 as intermediate values and/or intermediate results and can subsequently be evaluated.

The method can then be started from the beginning in Step 300 or terminated.

The invention claimed is:

1. A method for diagnosing at least one exhaust gas sensor (22;24;26) of an internal combustion engine (10), the at least one exhaust gas sensor (22;24;26) disposed in an exhaust duct (21), the method comprising:
    introducing ambient air (12) into the exhaust duct (21) by means of a device (27), when an operating state is present in which the internal combustion engine (10) does not produce an exhaust gas mass flow, and
    subsequently diagnosing, via an electronic control device, the at least one exhaust gas sensor (22;24;26) disposed in the exhaust duct (21).

2. The method according to claim 1, wherein the device (27) for introducing ambient air (21) into the exhaust duct (21) is disposed in the exhaust duct (21) upstream of the at least one exhaust gas sensor (22;24;26).

3. The method according to claim 1, wherein the device (27) is configured to introduce ambient air (12) directly into the exhaust duct (21) via a secondary air inlet (27) which is connected to the exhaust duct (21) and the device (27).

4. The method according to claim 1, wherein the device (27) is configured to actively introduce ambient air into the exhaust duct (21), wherein the ambient air is introduced into the exhaust duct (21) downstream in the flow direction of the exhaust gas (11).

5. The method according to claim 1, wherein the device (27) is configured to draw in ambient air (12), wherein the ambient air (12) is introduced into the exhaust duct (21) upstream against the flow direction of the exhaust gas (11).

6. The method according to claim 1, wherein the ambient air introduced into the exhaust duct is introduced within a defined distance of the location of the at least one exhaust gas sensor (22;24;26).

7. The method according to any claim 1, wherein the at least one exhaust gas sensor (22;24;26) is configured as a NOx sensor.

8. The method according to claim 7, wherein a NOx concentration ($NOx_{act}$) is determined by the at least one NOx sensor and the diagnosis for the at least one NOX sensor is carried out on the basis of a comparison of the NOx concentration ($NOx_{act}$) with a reference NOx concentration ($NOx_{ref}$).

9. The method according to claim 1, wherein the at least one exhaust gas sensor (22;24;26) is configured as a lambda sensor.

10. The method according to claim 9, wherein a current oxygen concentration ($O2_{act}$) is determined by the at least one lambda sensor and the diagnosis for the at least one lambda sensor (22;24;26) is carried out on the basis of a comparison of the current oxygen concentration ($O2_{act}$) with a reference oxygen concentration ($O2_{ref}$).

11. The method according to claim 1, wherein the device (27) is configured as a fan or secondary air pump or exhaust gas burner or as an opening comprising an actuating element in the exhaust duct (21).

12. The method according to claim 1, wherein a predefinable period of time ($\Delta t$) after the active introduction of ambient air (12) by the device (27) is waited before the diagnosis of the at least one exhaust gas sensor (22;24;26) is carried out.

13. A non-transitory, computer-readable storage medium containing instructions that when executed by a computer cause the computer to control:
    introduction of ambient air (12) into an exhaust duct (21) by means of a device (27), when an operating state is present in which an internal combustion engine (10) does not produce an exhaust gas mass flow, and
    diagnosis of at least one exhaust gas sensor (22;24;26) disposed in the exhaust duct (21).

14. A system comprising:
    at least one exhaust gas sensor (22;24;26) of an internal combustion engine (10) the at least one exhaust gas sensor (22;24;26) configured to be disposed in an exhaust duct (21), and
    an electronic control device configured to
        introduce ambient air (12) into the exhaust duct (21) by means of a device (27), when an operating state is present in which the internal combustion engine (10) does not produce an exhaust gas mass flow, and
        subsequently diagnose, the at least one exhaust gas sensor (22;24;26) disposed in the exhaust duct (21).

* * * * *